United States Patent [19]

Wallin

[11] 4,030,682

[45] June 21, 1977

[54] LOCKING MECHANISM FOR VEHICLE SAFETY BELTS

[75] Inventor: Jan-Olof Wallin, Mariefred, Sweden

[73] Assignee: Granges Essem Aktiebolag, Vasteras, Sweden

[22] Filed: Dec. 22, 1975

[21] Appl. No.: 643,116

[30] Foreign Application Priority Data

Dec. 23, 1974 Sweden .......................... 74162637

[52] U.S. Cl. ........................................ 242/107.4 B
[51] Int. Cl.² ................. A62B 35/02; B65H 75/48
[58] Field of Search ............. 242/107.4 R–107.4 E, 242/107.6, 107.7, 107.3; 74/577; 188/82.77, 136, 139; 280/744–747

[56] References Cited

UNITED STATES PATENTS

| 2,896,912 | 7/1959 | Faugier et al. | 188/136 X |
| 3,206,137 | 9/1965 | Snyderman | 242/107.4 B |
| 3,397,849 | 8/1968 | Hansen | 242/107.4 B |
| 3,929,300 | 12/1975 | Lindqvist | 242/107.4 B |

*Primary Examiner*—Stanley N. Gilreath

*Assistant Examiner*—John M. Jillions
*Attorney, Agent, or Firm*—Browdy and Neimark

[57] ABSTRACT

A locking mechanism for vehicle safety belts of the type in which a strap of the belt is automatically retracted into a housing and coiled up on a reel when the belt is not in use, to lock the reel at rapid extraction of the strap of the belt. The locking mechanism comprises a supporting means which is non-rotatably attached to the reel for rotation with it and which carries at least two latching means pivotably mounted on two pivot pins positioned symmetrically in relation to the reel and parallel with it. At rapid rotation of the reel, the latching means are turned by the centrifugal force about their respective pivot pins from a free position to a latching position with the forward portion in engagement with a stop means. The latching means are arranged to engage with each other in such a way that an angular turn of one latching means causes a corresponding equal large angular turn of the other latching means, so that the latching means are simultaneously turned out-wards into the latching position.

9 Claims, 2 Drawing Figures

LOCKING MECHANISM FOR VEHICLE SAFETY BELTS

The present invention relates to a locking mechanism for motor vehicle safety belts of the type in which a strap, which is part of the safety belt, is automatically drawn into a housing and coiled up on a reel when the belt is not in use to lock the reel at rapid extraction of the strap of the belt.

To provide locking of the reel in safety belts of the above-mentioned type, it is previously known to use pawls pivotally mounted on the reel, which are arranged to rotate with the reel and to be swung out to a locking position for engagement with a fixed stop, when the rotational speed of the reel or its acceleration exceeds a predetermined value. Such a construction is described in the U.S. Patent specification 2,982,492. In this known construction there are used two spring-suspended mutually independent pawls, which on rapid rotation of the reel are swung out to engagement with a ring gear arranged coaxially with the reel. Since the pawls swing out independently of each other, they do not usually come into engagement with the ring gear simultaneously, because of manufacturing and assembly tolerances. This can give rise to heavy stresses and uneven loads on the constructional details and especially on the pawls.

It is further known from the German Patent specification 1,964,128 to use two pawls and to control the pawls by means of a common inertia means. The pawls are thereby pivotally mounted on pins which are arranged on a plate rotating with the reel, and the inertia means is pivotally mounted on the reel between the two pawls so that the inertia means, which is arranged to swing about the reel axis at a rapid extraction of the strap of the belt, through its swinging movement provides a generally simultaneous out-swinging of the pawls which are arranged to abut the inertia means. In this construction as well, the pawls are arranged to engage with inside teeth on a ring gear positioned coaxially with the reel. Because an inertia means, which must be comparatively large to fulfil its function, is arranged between the pawls, the pawls have the shape of thin circle segments. As a consequence, the turning radius for the tip of the pawls which is to be brought into engagement with the ring gear is comparatively small, requiring a large angular turn of the pawls for the tips to be brought into engagement with the ring gear. To enable this large angular turning of the pawls and the inertia means, the gap between the pawls and the inertia means must be large. The result of this in this construction as well, is that one pawl usually comes into engagement earlier than the other, so that even here heavy stresses and uneven loads arise. A number of such stresses on the constructional details can seriously affect the function and reliability of the locking mechanism.

The main object of the present invention is to provide a locking mechanism with small dimensions in which the pawls or latching means are reliably brought into engagement with a fixed stop practically simultaneously.

By designing the latching means so that they, in the free position, reach substantially to a line running through the center of the reel at right angles to the connecting line between the pivot pins for the latching means, the turning radius for the engaging tips on the latching means can be made as large as possible, so that only a relatively small angular turn of the latching means is required for the tips of the latching means to come into engagement with a fixed stop, e.g. a ring gear.

Due to the fact that the necessary angular turn is small, only a small gap is required between the latching means, and the latching means can therefore be shaped so that they abut or engage with each other during the pivoting movement, and thereby control each other so that the engaging tips of the latching means are forced out simultaneously with great exactitude to the locking position.

To make the turning radius of the latching means as large as possible, the pivot pins should be placed at as great a distance from each other as is possible. Such a location also has the advantage that the torques occurring about the pivot pins will be as favourable as possible. Further advantages with the invention will be apparent from the following detailed description, which describes an advantageous embodiment of the invention while referring to the figures on the appended drawings.

Figure 1:
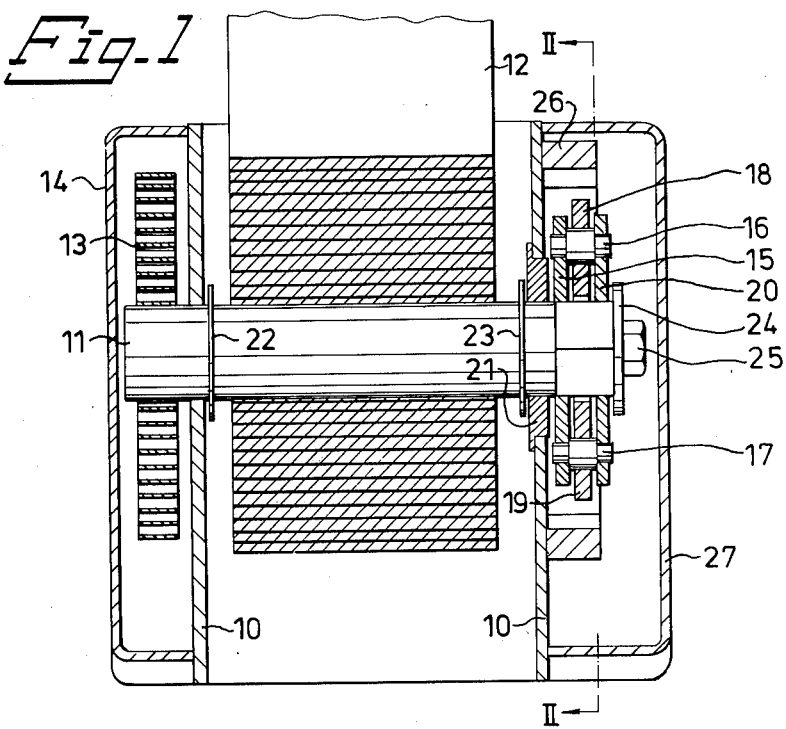
FIG. 1 shows in cross-section a reeling device for a safety belt in which the locking mechanism according to the invention is used.

The reeling device shown in FIG. 1 comprises a reel or spindle 11 rotatably mounted in a housing 10, there being a strap 12 as part of the safety belt or harness which can be reeled onto the spindle. At its lefthand end in the figure the spindle is connected to the inner end of a helical spring 13, the outer end (not shown) being firmly attached to a cover 14 fastened at the housing 10. The spring 13 is adapted for tensioning when the spindle rotates as the strap 12 is pulled out, and for causing the spindle to rotate in the opposite direction when tension in the strap ceases, so that the strap is automatically rewound on the spindle when the belt is not used, and is always kept tensioned when a person is using the belt. At its righthand end in the figure the spindle is provided with a locking mechanism which is arranged to provide locking of the spindle at rapid extraction of the strap, e.g. if a person using the belt is thrown forward, but to allow slow extraction of the strap, e.g. if the person using it leans slowly forward. The locking mechanism comprises a carrying plate 15 which is non-rotatably attached to the spindle 11 and arranged to accompany the spindle when it rotates.

The carrying plate 15 is arranged in a plane at right angles to the spindle and is provided with two projecting pins 16, 17 which are parallel with the spindle, and on which two pawls 18, 19 are pivotally mounted. Each pin thus carries its own pawl, as is more clearly shown in FIG. 2. On the spindle 11 there is further arranged a supporting plate 20 parallel to the carrying plate 15 and at a distance from it, the pawls 18, 19 being located between the two plates 15, 20. The pins 16, 17 project with their outer ends into holes in the supporting plate 20 so that the supporting plate 20 contributes to a stable and positive attachment of the pins.

At its righthand end in FIG. 1, the spindle 11 is journalled in a bearing 21 and the spindle is prevented from axial displacement by two locking discs 22, 23, both placed inside the housing immediately adjacent the walls thereof. The portion of the spindle carrying the locking mechanism itself has a square cross section, as is shown in FIG. 2, and the means comprising the locking mechanism are kept on the spindle by means of a stop washer 24 and a locking screw 25.

A ring gear 26 is attached to the housing 10, coaxially with the roller 11 and has inwardly directed teeth, the distance of which to the centerline of the spindle being so adjusted that the pawls in the retracted position, the free position, do not come into contact with the teeth and in the extended position, the latching position, come into engagement with the teeth. The location of the ring gear 26 in relation to the roller and the pawls is shown more clearly in FIG. 2. The means 15–20, 24–25, incorporated in the locking mechanism and arranged outside the housing 10, are enclosed by a cover 27 attached to the housing.

Figure 2:
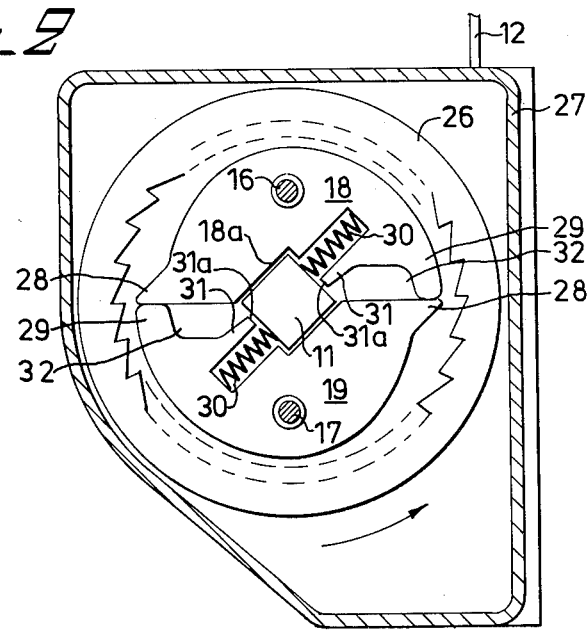
FIG. 2 shows a sectional side view of the locking mechanism along the line II—II in FIG. 1.

As may be seen from FIG. 2 the pins 16, 17 are symmetrically located diametrically in relation to the spindle 11 and at a relatively large distance from each other. The pawls abut each other, and the line of contact in the free position of the pawls is substantially at right angle to the line connecting the pins 16, 17 and passes through the centre of the spindle.

The pawls 18, 19 are arcuate and at one end provided with a projecting engaging tip 28, the other end being provided with a supporting tail 29. The pawls are identically alike, and the tip 28 is arranged at the forward end, in relation to the rotation of the spindle when the belt is being pulled out. This rotational direction is indicated with an arrow in Fig. 2.

Each pawl is provided with a compression spring 30, which is compressed between the spindle and the rear portion of the pawl, so that the pawls are normally kept in a retracted position, in which they with stop surfaces 18a abut the spindle. the rear portion of each pawl is further provided with a projection 31 extending towards the spindle. This projection has a flat contact surface 31a, which in the free position of the pawl is at a distance from the spindle, and in the latching position of the pawl is in contact with the roller for limiting the extension of the pawl, for reasons which will be more closely described below.

The rear portion of the pawls is provided with a cutaway portion or notch 32, which gives the forward portion of the pawls a greater mass than the rear portion, so that the extension of the pawls on rapid rotation of the spindle can take place through the action of centrifugal force.

The locking mechanism functions in the following manner. When the spindle rotates slowly, the pawls are kept in a retracted position, i.e. the free position, by the effect of the springs 30, which allows the spindle to continue to rotate so that the belt can be pulled out. When the spindle rotates rapidly due to the fact that a person using the belt is being thrown forward, i.e. when the vehicle is sharply braked, the pawls are pivoted outwardly against the bias of the springs 30, so that the engaging tips of the pawls are displaced outwardly into engagement with the surrounding ring gear. As the pawls are in engagement with each other they will be pivoted outwardly simultaneously, since the rear end of the one pawl forces the forward end of the other pawl outwardly, even if some differences should exist between the pawls due to manufacturing tolerances. As a very small gap between the pawls is sufficient for the necessary turning of the pawls to take place, the accuracy in the movement of the pawls will be very great, which means that the engaging tips of the pawls can come into engagement with the ring gear substantially simultaneously. If the stop projection 31 does not exist, or does not come into contact with the spindle, the pawls will be turned until they bottom in the space between two teeth in the ring gear. If the pawls do not bottom simultaneously, once again one of them will engage earlier than the other, giving rise to the above-mentioned drawbacks. If the pawls are to bottom simultaneously, it will be necessary to manufacture the ring gear with very high precision, and above all to exactly center the ring gear on the spindle. These conditions are difficult and expensive to meet, and to avoid them the stop projection 31 is arranged to stop the extension of the pawl just before it bottoms in the ring gear. The tips of the pawls will then stop the roller by engaging with the substantially radially directed surfaces on the teeth. The demand for precision in manufacturing the ring gear and in exact aligning it to the spindle is hereby reduced. Since the pawls 31 are brought into engagement with the spindle, and especially with a flat surface on the spindle, the maximum extension of the pawls can be determined with good accuracy, at the same time as the supporting tails of the pawls are relieved from compressive stresses.

Even if only one embodiment has been shown and described, it is obvious that a plurality of modifications and embodiments are possible within the scope of the invention. The pawls can have another geometric form, e.g. triangular, and the spring for returning the pawls or locking means can have another shape or location. The ring gear can be replaced by other fixed locking surfaces or possibly by a friction surface. The notch in the rear portion of each pawl can further consist of one or more holes with different locations, or be substituted by heavy elements which are placed on or in the forward portion of the pawls, so that the necessary difference in mass between the forward and the rear portion, required for the action of centrifugal force, is obtained. More than two pawls can be used, whereby the pawls commonly act on each other in such a way that they are turned out to the locking position simultaneously.

The supporting foot at the rear portion of the pawls can be shaped in many different ways to give substantially point- or line-shaped engagement surfaces between the pawls, which reduces the sensitivity of the mechanism to dirt and contaminations between the pawls.

I claim:

1. A locking mechanism to be used in vehicles for retractable safety belts having a strap, the mechanism comprising: a reel having an axis and on which the strap is coiled up when not in use means biasing said reel in a belt-retraction direction; a supporting means attached to said reel for rotation with it; at least two latching means, two respective pivot pins attached to said support means said two latching means being pivotally mounted on said two respective pivot pins and positioned diametrically and symmetrically in relation to said reel and in parallel with it; each of said latching means having substantially an identical shape and being positioned in a given plane perpendicular to said axis of said reel and in continuous abutment with each other in said plane to turn simultaneously under the influence of centrifugal force about their respective said pivot pins from a free position to a latching position; and a stop means fixed in relation to said real and positioned to engage with said at least two latching means when said at least two latching means reach their latching positions to lock said reel in the unwinding direction.

2. A locking mechanism as claimed in claim 1, wherein said at least two latching means consist of two identical latching means which in their free position abut one another at points along a line of separation which is substantially at a straight angle to a center line running between said two pivot pins.

3. A locking mechanism as claimed in claim 1, wherein respective rear portions of said at least two latching means are provided with a supporting surface means for abutting against said reel when said at least two latching means are in their latching positions.

4. A locking mechanism as claimed in claim 1, wherein respective forward positions of said at least two latching means are provided with a supporting surface means for abutting said reel when said latching means are in their free positions.

5. A locking mechanism as claimed in claim 1, wherein a compression spring is arranged between respective rear portions of each of said latching means and said reel.

6. A locking meachanism as claimed in claim 1, wherein a portion of said reel extends between said at least two latching means, said portion having a rectangular cross-section.

7. A locking mechanism as claimed in claim 1, wherein respective rear portions of said at least two latching means have a cut away portion or notch, respective forward portions of each said latching means having a larger mass.

8. A locking mechanism as claimed in claim 1, wherein each of said at least two latching means have an arcuate shape.

9. A locking mechanism as claimed in claim 1, wherein respective rear portions of said at least two latching means are provided with a respective projecting tail having a small surface abutting respective forward portions of an adjacent one of said at least two latching means.

* * * * *